United States Patent [19]

Maringer et al.

[11] Patent Number: 4,976,934
[45] Date of Patent: Dec. 11, 1990

[54] NESTED, RECIRCULATING-FIBER FILTER

[75] Inventors: Robert E. Maringer, Worthington; Herman Nack; Richard Razgaitis, both of Columbus, all of Ohio

[73] Assignee: Battelle Development Corporation, Columbus, Ohio

[21] Appl. No.: 948,210

[22] Filed: Dec. 31, 1986

Related U.S. Application Data

[63] Continuation-in-part of Ser. No. 730,710, May 3, 1985, abandoned.

[51] Int. Cl.$^5$ .................. B01D 24/12; B01D 24/28; B01D 24/44; B01D 53/34
[52] U.S. Cl. ........................................ 423/210; 55/79; 55/97; 55/390; 55/403; 55/404; 55/475; 55/477; 55/485; 55/527; 55/DIG. 44; 210/330; 210/359; 210/391; 210/508; 210/509; 210/786; 423/DIG. 13
[58] Field of Search ...................... 502/416; 55/79, 97, 55/390, 477, 527, DIG. 44, 99, 528, 393, 403, 404, 475, 485; 423/DIG. 9, DIG. 13, 215.5, 210; 210/786, 330, 508, 509, 359, 391, 502.1, 505

[56] References Cited

U.S. PATENT DOCUMENTS

| | | |
|---|---|---|
| 1,570,869 | 1/1926 | Thomson et al. .................... 55/99 |
| 3,151,187 | 9/1964 | Comte .................................. 55/97 |
| 3,708,210 | 1/1973 | Stähel et al. ........................ 55/97 |
| 4,110,081 | 8/1978 | Millar et al. ....................... 55/479 |
| 4,227,899 | 10/1980 | Meny et al. ....................... 55/528 |
| 4,229,187 | 10/1980 | Stockford et al. ................. 55/528 |
| 4,295,868 | 10/1981 | Holter et al. ..................... 55/302 |
| 4,302,221 | 11/1981 | Tanaka .............................. 55/73 |

FOREIGN PATENT DOCUMENTS 2024041 1/1980 United Kingdom .

Primary Examiner—Jeffrey Edwin Russel
Attorney, Agent, or Firm—Barry S. Bissell

[57] ABSTRACT

A recirculating fiber filter (1) and method is provided for removing particulates from moving fluid streams. High aspect ratio fibers (2) are used which readily nest with each other to form the high voidage fiber filter bed. In the method, fibers are continuously removed from the bottom of the bed regenerated to remove particulates and recycled back to the top of the bed and distributed thereon. Dirty fluid is passed from the top to the bottom of the filter. Dendrites of the particulate impurity appear to buildup in a thin section (A) at the top of the filter and provide the primary mechanism for further particulate entrapment. Recirculation of fibers offers a continuously fresh volume of fibers at the top for capture of particulates.

11 Claims, 2 Drawing Sheets

NESTED, RECIRCULATING-FIBER FILTER

RELATED APPLICATION

This application is a continuation in-part of U.S. Ser. No. 778,838 filed Sept. 23, 1985 and now abandoned..

TECHNICAL FIELD AND BACKGROUND ART

The invention relates to the field of removing particles in the range of about 10 microns (diameter) or less from fluid streams. This removal from air streams is typically done now with bag houses or electrostatic precipitators and from liquids with screens or filters. Bag houses usually employ fabrics which serve as the support for the buildup of a filter cake. Periodically, the filter cake is shaken or blown loose from the fabric and collected, and the cycle repeated. The filter cake is essentially a buildup of dust dendrites which provide the surface area for collection of submicron particles. Typical pressure drops are on the order of 16 cm W. C. (water column). As might be expected, there is some loss of efficiency after the cake is removed during the cleaning cycle and there tends to be a relatively high pressure drop during the latter phase of filtration just prior to cleaning. Furthermore, bag house fabrics may blind due to lodging of fine particles or sticky materials in the pores of the fabric.

In addition to commercial bag houses and electrostatic precipators, research and development work has been done on recirculating, granular-bed filters. These filters comprise a bed of granules in which the granules are recycled out the bottom of the bed, cleaned and returned to the top. Dirty gas flows from side to side or from bottom to top (counter-current to the granule movement).

The present nested-fiber bed is distinguished from the granule bed by its ability to nest the fibers in a controlled way to promote dendritic buildup of particles necessary to filter efficiently. The high voidage of the nest permits higher dust loading and higher efficiency at constant pressure drop. Moreover, the fibers and dirty fluid move in a co-current manner without disrupting the dendrites. Rolling motion in the granular bed tends to disrupt previously formed dendrites, thus reducing efficiency.

DESCRIPTION OF THE INVENTION

It is an object of the invention to provide a filter for the removal of particulates from fluid streams.

It is also an object to provide such a filter which is more efficient yet less costly to operate than previous methods including bag houses, electrostatic precipitators and recirculating, granular-bed filters.

It is an object to provide a continuous method of fluid cleaning by dendritic filtration wherein the filter element is continuously regenerated outside the filter assembly and then returned.

It is also an objective to provide a nested fiber bed which is useful for chemical processing and is operable continuously because regeneration is accomplished outside of the bed.

In accordance with the objectives, the inventive filter comprises a nested array of high-aspect-ratio fibers, means for denesting and removing the fibers from the bottom of the filter array, means for regenerating the denested fibers, means for renesting the regenerated fibers at the top of the filter array and means for passing the dirty fluid from the top of the filter array to the bottom.

The inventive method comprises forming the nested array of fibers, denesting and regenerating fibers from the bottom of the filter array, recycling and renesting the regenerated fibers at the top of the filter array and passing the dirty fluid through the filter generally from the top to the bottom of the filter array.

Controlling the voidage, fiber size, fluid velocity, etc. in the filter array and augmenting the removal by external influences (e.g. electrostatics) are methods of improving the efficiency of the basic capture method. The fibers can be made of special materials or coated therewith (for example, a catalyst) to improve the conversion/capture of waste gases/particulates.

Chemical reactions can also take place in the fiber bed ancillary to or independent of the filtering. For example, selective catalytic reduction of $NO_x$ can be carried out with ammonia. The fibers can be made of or coated with a metal oxide stable at about 1700° F.

DESCRIPTION OF THE PREFERRED EMBODIMENTS

Figure 1:
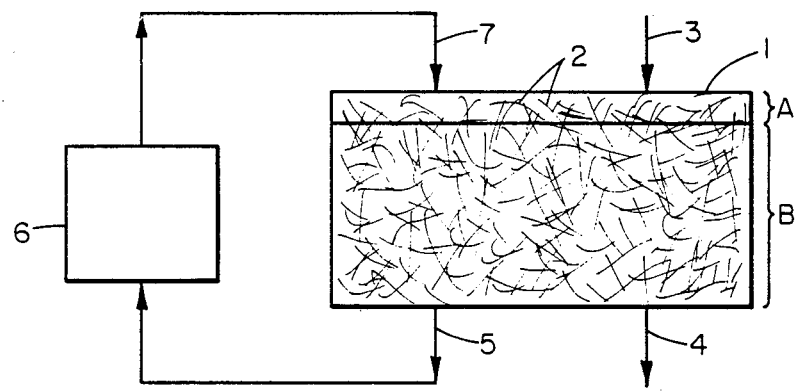
FIG. 1 is a schematic of a static filter region of the inventive filter bed.

Looking at FIG. 1, a static section of the fiber filter according to the invention is shown schematically. High-aspect-ratio (length to thickness ratio) fibers 2 are shown in a nested relationship within a filter array 1.

Particulate-laden fluid or waste fluid enters the filter at 3, is stripped of the particulates and/or undergoes chemical conversions of unwanted chemical species in the filter and exits at 4.

The filter includes means for denesting the fibers at 5 of the array, means 6 for regenerating the fibers to remove the particulates or regenerating the catalyst and means for renesting the fibers in the array at 7.

A fiber filter is a useful device for capturing particles of about 10 microns or less. Small particles (e.g. less than about 1 or 2 microns) are predominantly captured by diffusion and this capture depends on residence time near a fiber. For these particles, the efficiency goes down with an increase in face velocity. Larger particles are predominantly captured by impaction (impingement). This is an inertial effect which increases with an increase in face velocity. The geometric interception effect plays a dominant role for intermediate-sized particles and is rather independent of face velocity.

For either the diffusion or impaction mechanism, we have demonstrated that dendrites are formed on the fibers by a buildup of the captured particulate. To a point, the efficiency of capture by these dendrites improves as more particulates fill the bed. We have also found that in a static fiber bed the vast majority of this dendrite buildup and, therefore, the majority of the capture, takes place in a very small frontal volume of the fiber bed exposed to the dirty fluid. A typical region is shown at A in FIG. 1. The remaining region B does not contribute substantially to the capture of particulates in a static bed and is essentially wasted volume.

In the present invention, however, the region A is effectively moved downward in the bed and a fresh frontal region is exposed to the dirty fluid. Upon startup of a clean filter this is accomplished by removing relatively clean fibers from the bottom of the filter array at 5 and adding them on top of the dirty fibers at 7. Eventually, the entire region B is filled with the dirty fibers coated with particle dendrites and the only clean fibers are in region A (until they, too, capture the particulates). Thereafter, only dirty fibers are removed from the bottom. Particles are then captured throughout the bed, yielding much higher efficiencies than static filter beds of the same size. Preferably, the dirty fibers removed from the bottom are cleaned and recycled back to the top of the bed. Thus, the fibers move gradually from top to bottom, i.e. in the same direction as the fluid flow through the bed. We choose to refer to this a co-current flow of fibers and fluid, though the fibers are obviously moving at a much lower velocity but in the same general direction.

It has been found that the dendritic capture may be increased and the pressure drop decreased by increasing voidage. This leads to lower operating costs. One of the advantages of a fiber filter over a granular filter is the ability to develop and control this high voidage. The term voidage is intended to mean the percentage of a particular space which is empty of solids. It is calculated by determining the volume of the filter occupied by fibers, $V_f$, (for example, by dividing the mass of fibers by the density of the fiber material). The volume of empty space is then the total filter volume less the volume of fibers, $V_T$-$V_f$, and the voidage is the empty volume expressed as a percentage of the total volume, $$\text{voidage} = \frac{V_T - V_f}{V_T}.$$

The high voidage is created by a nesting or loose packing phenomenon. It has been found that high-aspect-ratio fibers tend to nest in a rather rigid, high voidage array when they are loosely poured into a container. The nesting is really a matter of degree, but for capturing fine particles in the 1-20 micron range, fibers in the range of about 0.075 to 2 mm diameter and aspect ratios of above about 20 are preferred in the present invention. The voidage appears to vary linearly with aspect ratio of the fibers. The preferred voidage is on the order of 90-96%.

The nesting of fibers also provides a second advantage over the packing of granules in the granular-bed filters. The fiber nests tend to be quite rigid compared with the loose granules. Thus, dendritic formations contributing to good capture are retained in the cohesive fiber bed as the bed shifts downward during operation. On the contrary, dendrites may be destroyed by the downward movement of the loose granules in a granular bed filter.

Fibers may be made of any useful material including both organic and inorganic materials. They may merely physically capture a particulate or may react chemically with a particulate or gas. The fibers may also be catalytic or be coated with inert, reactant or catalytic material. For example, metal fibers may have a catalytic coating to convert $SO_2$ in flue gas to $SO_3$ or a lime coating which can react with the $SO_2$ to produce a $CaSO_4$ deposit on the fiber.

Refractory fibers, as well as metal fibers, can be used for high temperature applications. For example, catalytic cracking of high-boiling hydrocarbons to gasoline fractions can take place at about 500° C. with fibers made (or coated) with modified, hydrated alumina silicates. Deposited carbon would be removed by burning in air in the regenerator.

Fibers are removed from the filter array by denesting. One method for denesting is shown schematically in FIG. 2. The fibers 2 are nested in the filter container 10. Rotating fingers 13 denest the fibers and allow them to fall individually or in small bundles to the receiver 14. The fibers are then transported by any convenient means, for example, by pneumatics or conveyors 15, to the regenerator 16. After regeneration, the clean fibers are transported to a distribution means (shown as a vibrating screen 18 in FIG. 2) for introduction to and nesting on the top of the existing filter array. The invention is not limited to the manner of denesting and it is sufficient that the method- remove the fibers in a state in which they may be transported, regenerated and returned to the filter array. Other possible forces for denesting are gas jets, acoustic fields, magnetostrictive forces and mechanical vibration.

Figure 2:
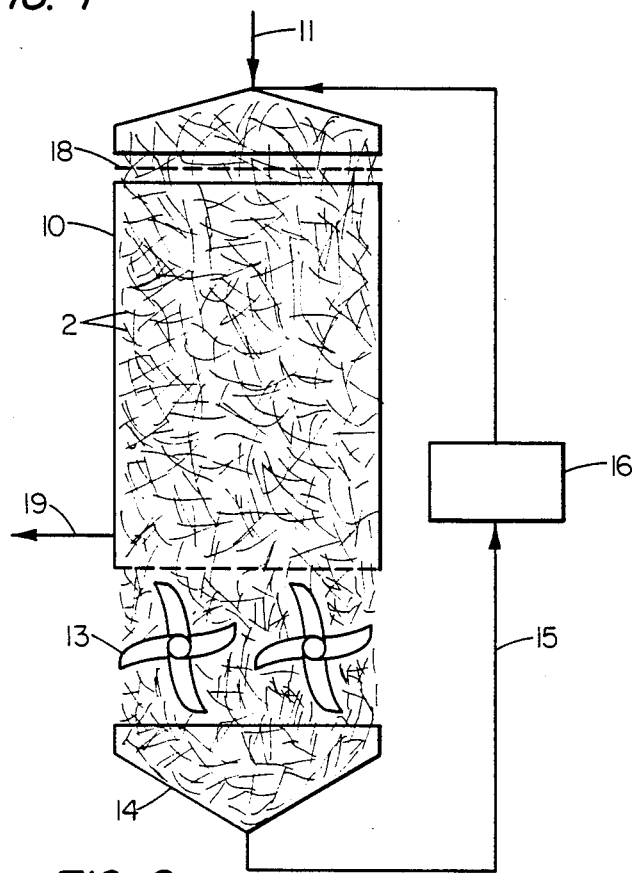
FIG. 2 is a schematic of filter bed apparatus for continuous operation according to the invention.

It is also not necessary to denest and remove fibers from the bottom of the bed. It may be more convenient to remove them from a side or from the top and recycle them (when clean) to an opposed face of the bed. For optimum performance, dirty gas must enter into the filter array near the face where the clean fibers are added and exit near the face where dirty fibers are denested and removed. As shown in FIG. 2, dirty gas enters at 11 and is removed at 19 above where fibers are denested.

The means for regeneration will of coarse depend on the physical or chemical reaction that takes place in the filter bed and the condition of the fibers. When the fibers are used to physically capture particulates, the typical means for cleaning may comprise vibration and/or gas or liquid stripping.

In the case where the fiber or a coating thereon enters into a chemical reaction, the regeneration method would generally comprise reversing the reaction. For example, in the case of a $CaSO_4$ coating on the fiber the regeneration would typically comprise heating the fibers to drive off the $SO_2$ or removal of $CaSO_4$ and recoating with $CaO$.

Other known methods of improving capture in the fiber filter can be used along with the present invention. For example, elecrostatic augmentation may be used wherein the particles and/or the fibers are charged. Electric and magnetic fields may also be used depending on the particle and fiber properties. All these methods merely enhance the collection due to the inventive method.

EXAMPLE 1 - FIXED (STATIC) BED CAPTURE

A 9 mm thick filter bed holder consisting of two coarse screens as fiber retainers and a 7.6 cm diameter section of circular PVC duct was constructed. The filter array itself was nested in the holder by allowing individual stainless steel fibers to "rain" into it by free fall. Average diameter of the fibers was 25 microns and the average length was 7 mm. An estimate of the packing density achievable by this method of nesting gave a value of 0.025. In order to avoid tunneling, however, the settled bed during the test was manually compacted to an estimated packing density of 0.054.

5 μm diameter, silica particles were used as the test contaminant. These particles were aerosolized with an aerosol generator and introduced to the upstream side of the filter.

Particles penetrating the nested filter were accumulated on an absolute backup filter. Air flow rate to the filter was measured by a ball rotameter and kept at 7.8 cm/sec. Resistance of the filter to the air flow was measured with an inclined manometer. Amounts of aerosol particles accumulated in both backup and nesting filters were determined gravimetrically, and efficiency of the nested filter was calculated as:

$$E = \frac{m_{nf}}{m_{nf} + m_f}$$

where $m_{nf}$, $m_f$ = mass of dust accumulated in the nested and backup filters, respectively.

A computer model was run for the conditions of the experiment and yielded a filtration efficiency of 86% for 5 μm particles and a pressure drop of 2.4 mm H₂O at 7.8 cm/sec. The corresponding measured values were 62% efficiency and 0.25 mm H₂O (the model for the pressure drop is probably less reliable than that for the efficiency). This discrepancy between the analytical prediction and the experimental results can probably be explained in large part by an air channel which formed between the fiber packing and the holder wall and was observed after the filter had been disassembled. Nevertheless, these results indicate that a nested filter can potentially achieve high efficiencies for particle diameter $\geq 5$ μm and that process parameters and a testing program can be designed with the analytical model.

EXAMPLE 2 - FIBER NESTING

Several fiber lots were poured into a measured volume and the bulk densities measured. Data is shown in Table 1.

TABLE 1

| Nesting Density of Fibers | | | | |
|---|---|---|---|---|
| Measured Average Length, cm | Measured Equivalent Diameter, microns | Filter Depth, cm | Bulk Density, g/cc[a] | Computed L/D |
| 1.5 | 227 | 8.3 | .487 | 66 |
|  |  | 9.4 | .496 |  |
| 2.0 | 390 | 8.0 | .540 | 51 |
|  |  | 8.9 | .496 |  |
| 2.7 | 458 | 5.8 | .621 | 59 |
|  |  | 9.7 | .627 |  |
| 3.5 | 434 | 9.2 | .302 | 81 |
|  |  | 9.3 | .311 |  |
| 2.0 | 186 | 9.2 | .216 | 108 |
|  |  | 8.2 | .197 |  |
|  |  | 9.0 | .260 |  |
| 1.102 | 66.3 | 3.6 | .15 | 166 |
|  |  | 2.1 to 2.2 | .153 |  |
| .536 | 51.8 | 1.9 to 2.3 | .295 | 103 |
|  |  | 7.1 | .28 |  |
|  |  | 2.1 | .267 |  |
| .273 | 45.8 | 0.6 to 5.6 | .582 | 60 |

[a]density of the fiber material was 8 g/cc

EXAMPLE 3 - DUST LOADING (FIXED BED)

Dust loading tests were run through a fiber filter using several different fibers. Dust having an average size of 6.3 microns was passed through the fibers at about 4.7 milligrams/minute. The data in Table 2 shows a consistent increase in efficiency with time and pressure as a result of the gradual filling of the matrix with dendrites.

The data also appears to show that a lower initial density leads to a lower increase in pressure drop with time and a lower pressure drop for a given efficiency of collection Increasing the diameter of the fibers results in a decrease in the collection efficiency after a given running time.

TABLE 2

| Case | Average Fiber Size (cm) | Filter Depth (cm) | Bulk Density (g/cc) | Gas Velocity (cm/sec) | Dust Loading (g/liter) | Run Time (hr) | ΔP (in. H₂O)[a] | Fiber Filter gain, (g) | Absolute Filter gain, (g)[b] | Percent Efficiency[c] |
|---|---|---|---|---|---|---|---|---|---|---|
| 1 | 0.536 × 0.00518 | 9 | 0.340 | 7.6 | 2.25 × 10⁻⁴ | 0 | 0.069 | 0 | 0 |  |
|  |  |  |  |  |  | 3 | 0.325/0.130 | 1.1 | 0.0372 | 96.6/96.9 |
|  |  |  |  |  |  | 5 | 0.428/0.286 | 0.5 | 0.0090 | 98.0/98.4 |
|  |  |  |  |  |  | 7 | 0.581/0.335 | 0.4 | 0.0065 | 98.2/98.6 |
|  |  |  |  |  |  | 9 | 0.753/0.470 | 0.5 | 0.0059 | 98.7/98.9 |
|  |  |  |  |  |  | 10 | 0.812 |  | 0.0027 |  |
|  |  |  |  |  |  |  |  | 2.5 |  |  |
| 2 | 0.536 × 0.00518 | 1.2 | 0.446 | 6.7 | 2.26 × 10⁻⁴ | 0 | 0.059 | 0 | 0 |  |
|  |  |  |  |  |  | 2 | 0.714/0.528 | 0.3710 | 0.0226 | 94.3 |
|  |  |  |  |  |  | 3 | 0.959/0.724 | 0.3068 | 0.0082 | 97.4 |
|  |  |  |  |  |  | 4 | 1.184 | 0.2854 | 0.0060 | 97.9 |
|  |  |  |  |  |  |  |  | 0.9632 |  |  |
| 3 | 0.536 × 0.00518 | 1.2 | 0.501 | 6.7 | 2.81 × 10⁻⁴ | 0 | 0.714 | 0 | 0 |  |
|  |  |  |  |  |  | 1 | 1.740 | 0.3032 | 0.0074 | 97.6 |
| 4 | 2.0 × 0.0186 | 9 | 0.260 | 7.6 | 1.09– 1.72 × 10⁻⁴ | 0 | 0.015 | 0 | 0 |  |
|  |  |  |  |  |  | 1.25 | 0.015 | 0.1 | 0.1215 | 29.2/55.3 |
| 5 | 2.0 × 0.0186 | 9 | 0.416 | 7.3 | 2.41 × 10⁻⁴ | 0 | 0.017 | 0 | 0 |  |
|  |  |  |  |  |  | 4 | 0.034/0.025 | 0.8 | 0.3361 | 67.2/69.9 |

TABLE 2-continued

| Case | Average Fiber Size (cm) | Filter Depth (cm) | Bulk Density (g/cc) | Gas Velocity (cm/sec) | Dust Loading (g/liter) | Run Time (hr) | ΔP (in. H₂O)[a] | Fiber Filter gain, (g) | Absolute Filter gain, (g)[b] | Percent Efficiency[c] |
|---|---|---|---|---|---|---|---|---|---|---|
| | | | | | | 10 | 0.133 | 1.4<br>2.2 | 0.3236 | 80.7/81.8 |

[a]after running the filter for each time increment, the filter was removed and weighed. When returned to the test apparatus, a new baseline pressure drop was recorded. The numbers reported are: ΔP at end of time increment/ΔP at start of time increment.
[b]An absolute filter was used downstream to capture dust passing through the fiber filter.
[c]Two values were assumed for filter gain at limits of accuracy (for example, 1.05 and 1.15 for 1.1). These were added to the "absolute filter" gain, and then divided by the "absolute filter" gain. The inversion was subtracted from 1, and changed to percent.

In all the above experiments, static fiber elements and fairly low face velocities and gas dust loadings were used to better understand the collection mechanism. The particulates in the fiber beds were substantially collected in a thin layer near the frontal opening. To the contrary, the present invention provides the means for using substantially the entire bed for collection and for making a continuous cleaning process, i.e. one that does not have to be shut down for periodic cleaning. The method for accomplishing this is to allow a buildup of particulates in the upper layer and then to successively move the layer lower in the bed by removing fibers from the bottom and recycling them (when clean) to the top. The fresh layer on the top then is built up with particulates and the process continues.

The high voidage of the present fiber nest allows its use with high dust loadings. The low pressure drop allows use of smaller beds and/or higher face velocities than conventional filters.

EXAMPLES 4-11 —NESTED-FIBER, RECIRCULATING ELEMENT BED

Figure 3:
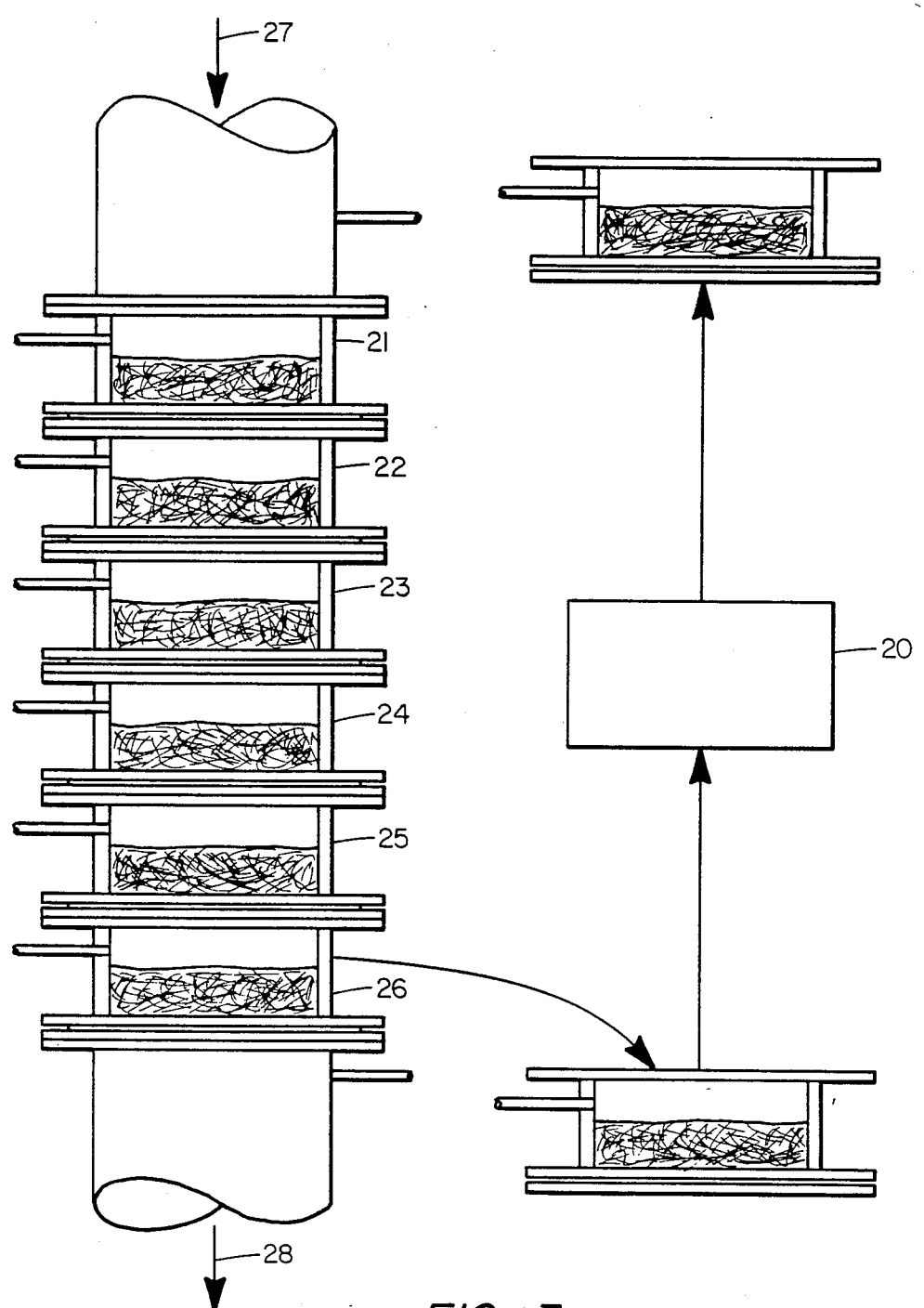
FIG. 3 is a schematic of the laboratory apparatus used in testing the invention.

In the experiments reported in Table 4, the operation of the invention was simulated in a stack of nested-fiber elements 21-26 such as shown in FIG. 3. Individual elements were removed from the bottom of the stack, cleaned in regenerator 20 and placed back in service at the top. Dirty gas 27 entered at the top with face velocity increased to about 50-100 cm/sec. Clean gas 28 exited at the bottom Type 304 stainless steel fibers were used in three sizes. Aspect ratios (L/D) were about 100. Nested-fiber properties are shown in Table 3.

TABLE 3

| Fiber Nest Properties | | | |
|---|---|---|---|
| Fiber | Nominal Size-cm | Density g/cm³ | Voidage (%) |
| A | 2.0 × 0.0186 | 0.40–0.30 | 96 |
| B | 1.3 × 0.0127 | 0.43–0.37 | 95 |
| C | 0.95 × 0.0076 | 0.86–0.73 | 90 |

The dust used for the experiments was a standard test dust referred to as Arizona Road Dust (fine air cleaner test dust, part no. 1—543094) available from General Motors AC Spark Plug Division. This dust was classified into two mono-dispersed particle size fractions.

The filter elements were made by dropping fibers onto a 70 mesh screen support. The elements were stacked and the dust-laden air was introduced from the top as shown in FIG. 3. A start-up period of operation was run during which time the filter was in operation and the top element was gradually moved to the bottom by successively removing the bottom element, cleaning it and reintroducing it as the top element. Once one element has been completely through the process, the system is said to be at equilibrium or steady state. Flow and pressure readings were made every 3-6 minutes. Every 12-30 minutes, the dust feeder was turned off, the gas flow stopped and each element weighed. The elements were then returned to the stack, but were advanced one position. Time intervals were kept constant for each particular experiment. Dust size was reported as, for example, $-5+1.5\ \mu$ meaning that the dust particles were substantially between 1.5 and 5 microns in diameter.

TABLE 4

| Nested, Recirculating-Fiber Filter Experiments | | | | | | | | | |
|---|---|---|---|---|---|---|---|---|---|
| Exp. No. | Velocity (cm/sec.) | Gas Dust Loading (g/m³) | Fibers L × D (cm) | Bed depth/element (cm) | No. Elements | Dust Loading, (kg/m³) | Dust Size (μm) | Filter Eff., (%) | Filter Rack Pressure Drop (cm, W.C.) |
| 4 | 53.5 | 0.73 | 2.0 × 0.0186 | 4.32 | 6 | 0.58 | −5 + 1.5 | 92 | 3.3 |
| 5 | 53.5 | 1.16 | 2.0 × 0.0186 | 4.32 | 6 | 2.8 | −5 + 1.5 | 95.3 | 6.1 |
| 6 | 53.5 | 1.55 | 2.0 × 0.0186 | 4.32 | 6 | 3.36 | −20 + 10 | 96.2 | 1.3 |
| 7 | 53.5 | 0.66 | 0.95 × 0.0076 | 2.54* | 4 | 1.6 | −5 + 1.5 | 99.1 | 6.6 |
| 8 | 53.5 | 0.94 | 1.3 × 0.0127 | 3.3 | 6 | 1.79 | −5 + 1.5 | 98.3 | 5.1 |
| 9 | 96.5 | 0.73 | 1.3 × 0.0127 | 3.3 | 6 | 1.63 | −5 + 1.5 | 98.3 | 6.35 |
| 10 | 96.5 | 1.14 | 1.3 × 0.0127 | 3.3 | 8 | 3.85 | −80 + 1 | 98.9 | 10.4 |
| 11 | 96.5 | 0.71 | 0.95 × 0.0076 | 3.3 | 7 | 1.79 | −5 + 1.5 | 99.9 | 23.6 |

*Includes section support screen pressure drop.

RESULTS AND CONCLUSIONS

1. High filter efficiencies are possible at low pressure drop.

Interpolation of the data from Experiment 11 indicated that 3-4 bed sections would have been required cm W. C. This is consistent with extrapolated data for Experiment 7 taken at 53.5 cm/sec. That data indicated 12.7 cm of bed was required to achieve 99.5 percent efficiency with a resulting pressure drop of 7.9 cm W. C.

2. Smaller fibers may offer a pressure drop advantage for the same filter efficiency.

Based on the efficiency data at 53.5 cm/sec it was estimated that 12.7 cm of 0.95×0.0076 cm fibers would be required for 99.5 percent efficiency at 7.9 cm W. C. pressure drop. This compares with a 36.2 cm bed of 1.3×0.0127 cm fibers at 11.7 cm W. C. pressure drop and a 56 cm of 2.0×0.0186 cm fibers at 16.5 cm W. C. pressure drop.

At 96.5 cm/sec the pressure drop advantage for the smaller fiber was still evident though less pronounced. The estimated pressure drop to achieve 99.5 percent efficiency was 11.5 cm W. C. and 12.2 cm W. C. for 0.95×0.0076 cm fibers and 1.3×0.0127 cm fibers, respectively.

3. Filter efficiency improves with filter dust loading.

A comparison of the results from Experiments 4 and 5 show an increase in filter efficiency from 92 to 95.3 percent as the filter dust loading was increased from 0.0058 g/cc to 0.028 g/cc.

The filter pressure drop also increases with dust loading. The optimum trade off of dust loading and pressure drop for filter efficiency has not been established. However, for the range of conditions studied, pressure drop at a given filter efficiency appears to be only moderately sensitive to filter dust loading. The conclusion is that filter dust loading even higher than those achieved in any of the tests would prove beneficial, i.e., enhancing filter efficiency with little pressure drop penalty.

4. For large particles ($-20\mu+10\mu$) the bed depth required for a given efficiency is nearly the same as for smaller ($-5\mu$) particles, but the pressure drop is much lower.

Extrapolated data for 99.5 percent filter efficiency with 2.0×0.0186 cm fibers indicate that the pressure drop for $-5\ \mu+1.5\ \mu$ particles is 16.5 cm W. C. as compared with a pressure drop of 2.5 cm W. C. for $-20\ \mu+10\ \mu$ particles.

5. Increasing face velocity has little effect on filter efficiency.

Experiments 8 and 9 using 1.3×0.0127 cm fibers were run at face velocities of 53.5 cm/sec and 96.5 cm/sec, respectively, other conditions were essentially the same. The equilibrium filter efficiency for both experiments was 98.3 percent. Experiments 7 and 11 using 0.95×0.0076 cm fibers were run at 53.5 cm/sec and 96.5 cm/sec, respectively. The extrapolated filter efficiency results were essentially the same for both.

6. Despite its larger average particle size the poly-dispersed dust used in these tests appear to be more difficult to filter than the fine $-5\ \mu+1.5\ \mu$ dust.

A comparison of the final filter efficiency for Experiments 9 and 10 indicates that the $-80\ \mu+1\ \mu$ dust required a higher dust loading to achieve the same filter efficiency as the $-5\ \mu+1.5\ \mu$ dust. The first element efficiency for the $-80\ \mu+1\ \mu$ dust was 72 percent as compared with 84 percent for the $-5\ \mu+1.5\ \mu$ dust.

We claim:

1. A device for removing a pollutant from a fluid stream comprising:
   (A) a nested array of fibers having a fluid entrance at a first boundary region of the array and a fluid exit at a generally opposed second boundary region of the array,
   (B) means for passing the pollutant-containing fluid stream through the nested array from the fluid entrance to the fluid exit,
   (C) means for removing fibers from the second boundary region of the array, and
   (D) means for recycling the removed fibers from the second boundary region back to the first boundary region of the array, such that there is an overall movement of fibers from the fluid entrance toward the fluid exit and substantially co-current to the fluid stream.

2. The device of claim 2 which further comprises means for regenerating the removed fibers.

3. The device of claim 2 for filtering particulates from the fluid stream wherein the fibers have an aspect ratio of at least about 20 and the nested array has a voidage of at least about 90%.

4. The filter device of claim 3 wherein the nested array further comprises a plurality of discrete elements, each comprising a container and a nested layer of fibers.

5. The filter device of claim 3 which further comprises means for denesting individual fibers or groups thereof removed from the second boundary region and means for renesting the removed fibers at the first boundary region.

6. The device of claim 2 wherein a surface of the fibers is reactable with or catalytically active with respect to the pollutant to convert the pollutant.

7. A method for removing a pollutant from a fluid stream comprising:
   (A) forming a nested array of fibers having a fluid entrance at a first boundary region of the array and a fluid exit at a generally opposed second boundary region of the array,
   (B) passing the pollutant-containing fluid stream through the nested array from the fluid entrance to the fluid exit such that the pollutant contacts the fibers and is removed by interaction therewith,
   (C) removing fibers from the second boundary region of the array, and
   (D) adding fresh fibers to the first boundary region of the array, such that there is an overall movement of fibers in the array from the fluid entrance toward the fluid exit and substantially co-current to the fluid stream.

8. The method of claim 7 for continuous operation which additionally comprises recycling the removed fibers from the second boundary region to the first boundary region.

9. The method of claim 8 which additionally comprises regenerating the removed fibers.

10. The method of claim 9 wherein fibers are removed from the second boundary region by denesting individual fibers or groups thereof and wherein fresh fibers are added to the first boundary region by renesting.

11. A method for filtering a particulate from a fluid stream comprising:
   (A) forming a nested array of fibers having aspect ratios above about 20,
   (B) passing the particulate-laden fluid stream through the nested array in contact with the fibers from an entrance end of the array to a generally opposed exit end of the array, such that particulates are deposited on the fibers within the array,
   (C) denesting and removing particle-laden fibers from the exit end of the array,
   (D) regenerating the removed, particle-laden fibers by removing the particulates therefrom, and
   (E) renesting the regenerated fibers in the array at the entrance end, such that there is an overall movement of fibers toward the exit end of the array co-current to the fluid stream.

* * * * *

UNITED STATES PATENT AND TRADEMARK OFFICE
CERTIFICATE OF CORRECTION

PATENT NO. : 4,976,934

DATED : December 11, 1990

INVENTOR(S) : Robert E. Maringer, Herman Nack, and Richard Razgaitis

It is certified that error appears in the above—identified patent and that said Letters Patent is hereby corrected as shown below:

Column 1 line 6 delete "778,838" and insert --730,710--
Delete "Sept. 23," and insert --May 3,--

Column 8 lines 57 and 58 insert between [required] and [cm] --, to give 99.5 percent efficiency at a pressure drop of 11.5--

Signed and Sealed this

Ninth Day of February, 1993

Attest:

STEPHEN G. KUNIN

*Attesting Officer*       *Acting Commissioner of Patents and Trademarks*